UNITED STATES PATENT OFFICE.

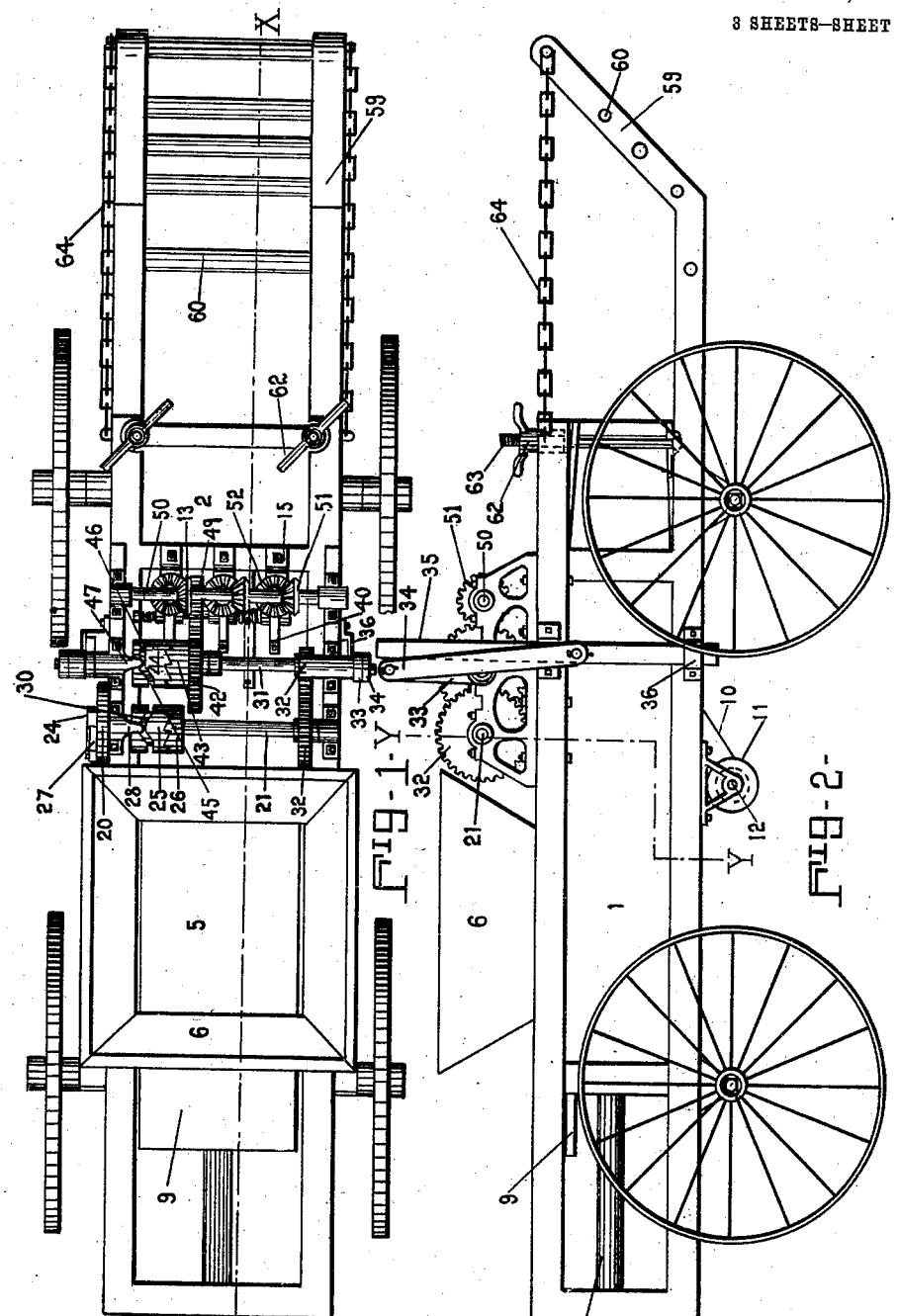

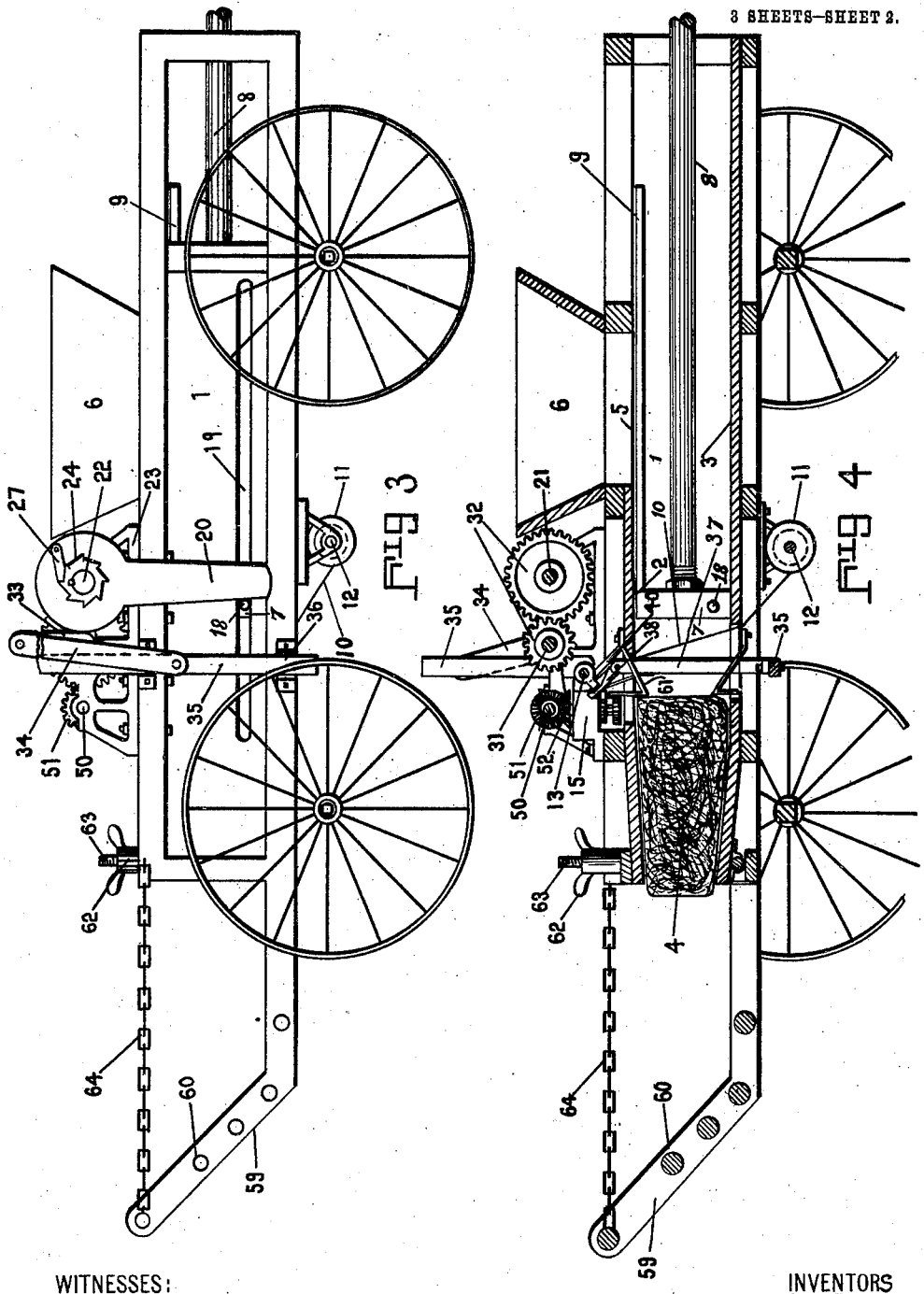

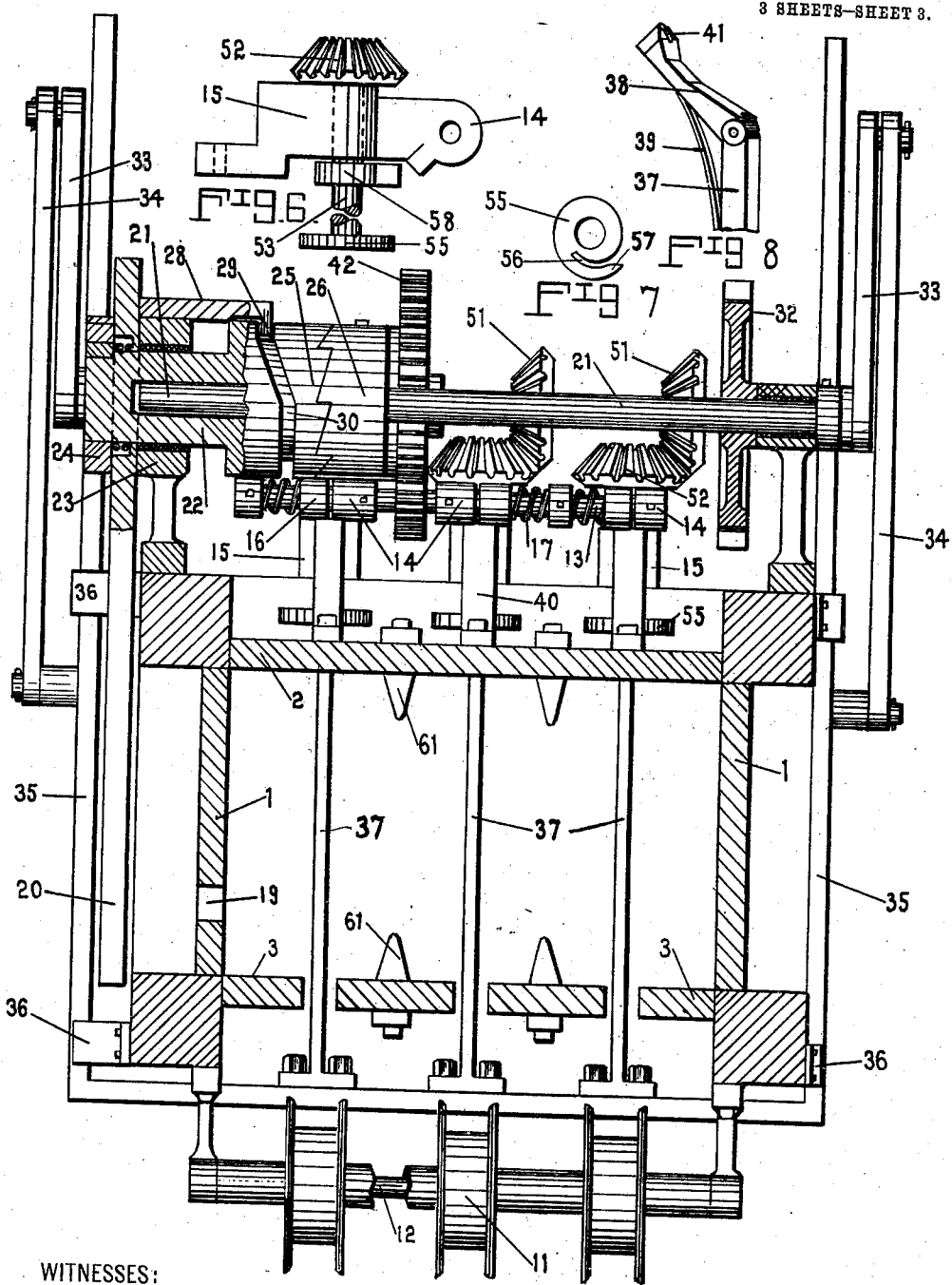

WILLIAM S. PARVIN AND WARWICK J. MUSE, OF DALLAS, TEXAS; KATE PARVIN EXECUTRIX OF SAID WILLIAM S. PARVIN, DECEASED.

AUTOMATIC HAY-PRESS.

986,750.  Specification of Letters Patent.  Patented Mar. 14, 1911.

Application filed April 14, 1910.  Serial No. 555,353.

*To all whom it may concern:*

Be it known that we, WILLIAM S. PARVIN and WARWICK J. MUSE, citizens of the United States, residing at Dallas, in the county of Dallas and State of Texas, have invented certain new and useful Improvements in Automatic Hay-Presses, of which the following is a specification.

Our invention relates to new and useful improvements in automatic hay-presses. Its object is to provide a hay-press, in which the baling wires will be passed around three sides of the bale as it is formed, means being provided for passing the wires across the fourth side, after the bale is pressed, and also means for tying and cutting the wires.

Another object of the invention is the provision of periodically acting mechanisms, automatically operated by the travel of the press-head, which will pass the baling wires across the aforesaid fourth side of the bale, and which will set in motion the means employed for tying and cutting the baling wires.

A further object is to provide an inclined roller bearing platform upon which the bales will be ejected from the press-box, and which will elevate the bales to a height from which they will fall either into a wagon or to the ground, offering no obstruction to the exit of other bales from the press.

A still further object is to eliminate the necessity of follow-blocks, which in the present practice are required between the bales.

Finally the object of the invention is to provide a device of the character described, that will be strong, durable and efficient, and comparatively easy to construct, and also one the various parts of which will not be likely to get out of working order.

With these and various other objects in view, our invention has relation to certain novel features of the construction and operation, an example of which is described in the following specification, and illustrated in the accompanying drawings, wherein:

Figure 1 is a plan-view of the press. Fig. 2 is a side elevation thereof. Fig. 3 is an elevation of the opposite side. Fig. 4 is a longitudinal sectional elevation taken on the line *x—x* of Fig. 1. In this view a bale is shown formed in the baling chamber of the press, with the baling wires elevated ready to be tied and cut. Fig. 5 is a transverse sectional elevation taken on the line *y—y* of Fig. 1. Fig. 6 is a detail side view of a bracket of special construction adapted to mount a vertical spindle and also a horizontal rod. The spindle is shown mounted in its bracket with a gear upon its upper extremity and devices upon its lower extremity adapted to tie and cut the baling wires. Fig. 7 is a detail view of a disk to be mounted upon the aforesaid vertical spindle. Fig. 8 is a perspective view of a spring-pressed-finger, which is jointed upon the upper extremity of a rod adapted to be elevated beneath one of the baling wires to raise to same when the same has been formed. In these views the plunger rod operating the presshead is shown broken away, it being understood that any well known means may be employed to give the plunger-rod its stroke.

Referring now more particularly to the drawings, wherein like numerals of reference designate similar parts in all the figures, the numeral 1 denotes the sides of the elongated press-box, 2 the top thereof, and 3 the longitudinal slats which constitute the bottom of the box. The forward end of the box forms a baling chamber 4, within which the bales are compressed. An aperture 5, inclosed by a hopper 6 is provided in the top of the box to permit the hay to be fed thereinto. A press-head 7 slidable in said box, is actuated by a plunger rod 8, the rearward stroke of the press-head placing it clear of the aperture 5. From the top of the press-head, a horizontal plate 9 projects rearwardly, which plate forms a bottom to the hopper when the press head is at the forward portion of its stroke, preventing hay from entering the box behind the press-head.

The baling wires 10 are wound upon the spools 11 carried by a shaft 12, transversely mounted beneath the press-box. The three wires are passed through the bottom of the press and carried upward across the press-box to the top thereof, where means are provided to which the extremities of the wires are secured. As each forward stroke of the press-head thrusts a quantity of hay against the wires 10, these wires are carried forward into the baling chamber 4, the spools 11 rotating at the same time, as the wire is drawn from them. The means employed to secure the extremities of the bailing wires consist in a number of pairs of clamps carried by a rod 13 mounted upon the top of the press box transversely thereof. This rod is rigidly mounted in a plurality of collars 14, which collars are integrally supported from a number of brackets 15, mounted upon the top of the press-box. These collars together with the clamping members 16 slidable upon the rod 13, and acted upon by coil springs 17, form clamps between which the extremities of the baling wires are adapted to be caught and held.

The means employed to raise the baling wires from the floor of the press box to the top thereof, and to tie and cut the wires when raised are both actuated by the stroke of the press-head as follows: A pin 18 projects from the edge of the press-head through a slot 19 extending longitudinally of the press-box as shown in Fig. 3. This pin, during the forward portion of the stroke contacts with the lower extremity of a lever 20, adapted to periodically impart rotation to a shaft 21 transversely mounted upon the top of the press box. The upper extremity of the lever 20 is loose upon a sleeve 22 which is itself loose upon the shaft 21, and adapted to undergo periodic transverse displacement thereupon. The sleeve 22, which is rotatably mounted in a bearing 23 carries a ratchet wheel 24 fast upon its outer extremity, and a clutch gear 25 fast upon its inner extremity, the latter being adapted to engage a clutch gear 26 fast upon the shaft. Upon the upper extremity of the lever 20, a dog 27 is mounted which communicates rotation to the ratchet-wheel 24, when the lever 20 is displaced during the rearward stroke of the press-head. As the press-head approaches the rearward extremity of its stroke, the lever 20 will be released by the pin 18 and will return to a vertical position by reason of its own weight. On the forward stroke of the press-head, the lever 20 will be displaced to an angle toward the front where it will be again picked up by the pin, as the press-head moves rearward. By this means a partial rotation of the sleeve 22 is accomplished during each rearward stroke of the plunger, the fraction of a revolution produced during each stroke being inversely equal to the number of strokes necessary to compress a bale. From the bearing 23 a bracket 28 projects above the sleeve 22, having upon its extremity a pin 29, which enters an annular groove 30 in the clutch gear 25. This groove is provided with an off-set portion the angle of whose arc is equal to the angle through which the lever is displaced during each stroke. Therefore, during a fractional part of each revolution of the sleeve 22, the pin 29 is in the off-set portion of the groove 30, causing the clutch gear 25 to be transversely displaced (with the sleeve and ratchet wheel with which it is integral) and to mesh with the clutch gear 26 producing rotation of the shaft.

Rotation is communicated from the shaft 21 to a second transverse shaft 31 through a pair of spur gears 32, having a velocity ratio such that each periodic partial rotation of shaft 21 produces one complete rotation of the shaft 31. Upon each extremity of the shaft 31 an arm 33, is rigidly mounted, and the outer extremities of these arms are connected by links 34 with the lower extremity of a U-shaped frame 35. The horizontal member of this frame extends transversely beneath the press-box, and the two vertical members thereof are adapted to be adjusted up and down in guides 36 attached to the sides of the press-box. When the shaft 31 is stationary, this frame is in its lowest position, and each time that said shaft completes a revolution, the frame is raised from its lowest to its highest elevation and again lowered. Upon the base of the frame 35 three vertical bars 37 are mounted, one beneath each of the baling wires 10. Upon the upper extremity of each bar, a pivoted finger 38 is mounted. The fingers 38 are normally vertical, being held so by springs 39. When the frame 35 is in its highest position, however, these fingers come into contact with inclined plates 40, causing them to be displaced at an angle, for purposes hereinafter made clear. It is to be noted that a raised portion is formed upon the extremity of each finger, the purpose of which is also hereinafter explained. The upper extremities of these fingers are each provided with a small transverse groove 41 which receives one of the wires 10 as the frame 35 is raised. It is intended that the fingers 38 be positioned immediately beneath the floor of the press box, when the frame 34 is lowered. When the frame is raised, the fingers 38 come up beneath the wires 10, receiving them in the grooves 41 and elevating them to the top of the press-box, the spools 11 being simultaneously rotated as the wires are drawn from them.

The upper extremities of the fingers are wedge-shaped, adapting them to insert themselves between the collars 14 and the clamping members 16 just as they reach the upper limit of their vertical movement, displacing the members 16 and releasing the extremities of the wires 10 which were held by said clamps. Before the wires 10 are thus released however, the mechanism for tying the wires will have been set into operation as described hereinafter. As the frame 35 begins its descent, and the wedge-shaped extremities of the fingers are withdrawn from between the clamps, the clamps will again close upon the wires 10, just behind the raised portion of each finger. The raised portions serve to hold a sufficient portion of the wires clear of the fingers to permit the clamps to close upon said wires. Having performed the functions just described, the frame 35 is again lowered until the fingers are clear of the press-box, and remains stationary until another bale has been formed.

Upon the shaft 31, a gear 42 to which a clutch gear 43 is rigidly attached, is mounted loose. This gear is adapted to be engaged by a sliding clutch gear 44, restricted against rotation upon the shaft. The gear 44 is provided with an annular groove 45 having an off-set portion 46 extending about half-way around the gear. A bracket 47, supported from one of the bearings 48 of the shaft, similar to the bracket 26 previously described, carries a pin entering the groove 45, similar to the pin 27 upon the bracket 26. The gear 44 meshes with a pinion 49, upon a third transverse shaft 50. Upon this latter shaft are mounted three beveled pinions 51, each of which meshes with a beveled pinion 52 upon the upper extremity of a vertical spindle 53. The spindles 53 are mounted in brackets 15 upon the top of the press-box. Upon the lower extremity of each spindle, a disk 55 is fast, having a spiral groove 56 extending toward its center. It is intended that the clutch gears 44 and 49 be thrown into mesh, as the frame 35 reaches the upper limit of its travel. Rotation will then be communicated to the spindles 53 and during this rotation the wires 10 will be caught by the projection 57 of the disks 55 and carried into the grooves 56. The spindles 53 will accomplish several rotations as the frame 35 descends, twisting each of the baling wires 10 sufficiently to make a firm connection. During the first rotation of the spindles 53, the baling wires will be sheared between a blade 58 mounted upon each spindle above the disk 55 thereupon, and the lower edge of the bracket 15. As the frame 35 descends and the fingers escape from contact with the inclined plates 40, the springs 39 will return the fingers 38 to a vertical position, so that they will not contact with the disks in descending.

As the bales are ejected from the press-box, they encounter an inclined platform, composed of side beams 59 between which are mounted rollers 60. The bales travel up this platform and drop from the upper edge thereof, either to the ground, or into some suitable vehicle.

The numeral 61 denotes the usual form of spring mounted upon the top and bottom of the press-box at the entrance to the baling chamber to prevent the bale expanding during the rear stroke of the press-head. The numeral 62 designates a pair of clamps mounted upon vertical screws 63 for the purpose of adjusting the distance between the upper and lower walls of the baling chamber at the rear thereof. No novelty is claimed for this feature which is shown merely to make the press operative. Chains 64 connect the upper portion of the aforementioned inclined platform with the press-box, maintaining said platform in its inclined position.

The operation of this hay press is as follows: Before the power is applied, the baling wires are drawn from their respective spools sufficiently to pass through the press-box and the extremities are clamped between the collars 14 and the clamping members 16. Hay is now fed into the hopper and the mechanism set into operation. As the press head completes each forward stroke a quantity of hay is pressed against the baling wires 10, driving them into the baling chamber. This process continues until a sufficient quantity of hay has been introduced into the baling chamber to form a bale. The number of the press-head strokes required to complete a bale will be approximately 5 or 6. Each of these strokes produces a partial rotation of the sleeve 22 as previously described. As the press-head moves rearwardly after having thrust the final quantity of hay into the baling chamber necessary for a bale, the sleeve 22 will have rotated sufficiently to close the clutch 25 and 26 thus setting up rotation of the shaft 21. The spur gears 32 will then communicate rotation to the shaft 31 sufficient to produce one complete revolution of said shaft. During this revolution the frame 34 will pass through its complete cycle of motion, being raised to its highest elevation and again lowered.

As previously explained, the frame 34 raises the wires 10 during its upward travel by means of fingers 38 upon the upper extremities of the rods 37. As the frame 34 reaches the upper limit of its travel, the shaft 31 will have rotated sufficiently to close the clutch 44 and the clutch 49, thus setting up rotation of the gearing which operates the tying and cutting mechanism. When the fingers 38 contact with the inclined plates 40 they are deflected toward the tying and cutting mechanism assuming the position shown in Fig. 4. The wedge-shaped raised portion of each finger will pass between one of the collars 14 and clamping members 16, displacing the latter and releasing the extremity of the baling wire which was clamped between these two parts. The fingers 38 will be sufficiently displaced to cause their extremities to pass entirely through the space between the collars 14 and clamps 16. These clamps will then close upon the wires which were raised by the fingers, and will continue to hold said wires until a new bale has been formed and the operation just described is repeated.

We are aware that changes may be made in the form and proportion of the parts and details of the above described invention without departing from the spirit or sacrificing the advantages thereof, and we therefore reserve the right to make such changes and alterations in said device as fairly come within the scope of the following claims:

What we claim is:

1. In an automatic hay press, the combination with an elongated press box having a baling chamber in one extremity thereof, of a press head adapted to travel back and forth therewithin, wire-lifting means adapted to be elevated through the press box at the entrance to the baling chamber, the upper portion of said wire-lifting means being jointed and adapted to undergo angular displacement, wire-clamping means mounted upon the press box above the wire-lifting means and adapted to be released thereby, wire-twisting and cutting means mounted upon the press box adjacent to said wire-clamping means, means adapted to deflect the upper portion of the wire-lifting means toward the wire-cutting and twisting means, and mechanism communicating periodical motion to the wire-lifting, and to the wire-twisting and cutting means from the press head.

2. In an automatic hay press, the combination with an elongated press box, having a baling chamber at one extremity, of a press head adapted to travel back and forth therewithin, wire-lifting means adapted to be periodically elevated through the press box at the entrance to the baling chamber, rotatable wire-receiving means mounted beneath the press box, wire-clamping means mounted upon the press box above the wire-lifting means and adapted to be released thereby, rotatable wire-twisting and cutting means mounted upon the press box adjacent to said wire-clamping means, and operating in conjunction with the wire-lifting means, a shaft mounted upon the press box, a lever having its upper extremity mounted upon said shaft, to which lever an angular displacement is communicated by each stroke of the press head, means by which said lever communicates rotation to the shaft on which it is mounted after receiving a certain number of displacements, mechanism adapted to actuate the wire-lifter from said shaft, and mechanism automatically operated during a portion of each partial rotation of said shaft, communicating rotation to the wire-twisting and cutting means.

3. In an automatic hay press, the combination with an elongated press box, having a baling chamber at one extremity, of a press head adapted to travel back and forth in said box, wire-lifting means adapted to be periodically elevated through the press box at the entrance to the baling chamber, the upper extremity of said means being capable of angular displacement, means for deflecting said upper extremity of the wire-lifting means when the same is in its raised position, wire-receiving means rotatably mounted beneath the press box, wire-clamping means mounted upon the press box above the entrance to the baling chamber and adapted to be released by the wire-lifting means, vertical spindles rotatably mounted upon the press box adjacent to the wire-clamping means, disks mounted upon said spindles, each having a spiral slot extending toward its center, mechanism periodically actuating the wire-lifting means from the press head, mechanism operated from the press head periodically communicating rotation to said spindles, and an upwardly inclined roller bearing platform upon which the bales are ejected from the press box.

4. In a hay press, the combination with an elongated press box, of a press head adapted to travel back and forth therewithin, wire lifting means adapted to periodically undergo vertical displacement within said box, vertical spindles rotatably mounted upon the press box above the wire lifting means, a disk mounted upon each of said spindles having a spiral slot extending toward its center, means by which rotation may be intermittently communicated to said spindles and means by which a mechanism for periodically actuating the lifting means may be operated.

5. In a hay press, the combination with an elongated press box having a baling chamber at one extremity, of a press head adapted to travel back and forth in said box, wire lifting means adapted to be elevated through the press box at the entrance to the baling chamber, the upper portion of said wire lifting means being jointed and adapted to undergo angular displacement, a plurality of vertical spindles mounted upon the press box above the wire lifting means, a disk mounted upon each spindle having a spiral slot extending toward its center, means mounted adjacent to said spindles adapted to deflect the jointed upper portion of the wire lifting means toward the slotted disks, means adapted to communicate an intermittent rotation to the aforesaid spindles, and a mechanism by which the wire lifting means may be periodically actuated.

6. In a hay press, the combination with an elongated press box having a baling chamber at one extremity, of a press head adapted to travel back and forth therewithin, wire lifting means adapted to be elevated through the press box at the entrance to the baling chamber, the upper portion of said wire lifting means being jointed and adapted to undergo angular displacement, wire twisting and cutting means mounted upon the press box and adapted to operate in conjunction with the wire lifting means, means by which the jointed upper portion of the wire lifting means may be deflected toward the twisting and cutting means, and mechanism communicating motion periodically to the wire lifting and to the wire twisting and cutting means from the press head.

In testimony whereof we have signed our names to this specification in the presence of two subscribing witnesses.

WILLIAM S. PARVIN.
WARWICK J. MUSE.

Witnesses:
S. R. HICKMAN,
G. B. COULSON.

Copies of this patent may be obtained for five cents each, by addressing the "Commissioner of Patents, Washington, D. C."